United States Patent
Zahir et al.

(12) 
(10) Patent No.: US 6,353,805 B1
(45) Date of Patent: *Mar. 5, 2002

(54) APPARATUS AND METHOD FOR CYCLE ACCOUNTING IN MICROPROCESSORS

(75) Inventors: Achmed R. Zahir, Menlo Park; Vincent E. Hummel, San Jose; Ralph M. Kling, Sunnyvale; Tse-Yu Yeh, Milpitas, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/056,451

(22) Filed: Apr. 7, 1998

Related U.S. Application Data

(63) Continuation-in-part of application No. 09/001,309, filed on Dec. 31, 1997, now Pat. No. 6,052,802.

(51) Int. Cl.[7] ............................................... G06F 11/00
(52) U.S. Cl. ..................... 702/182; 714/47; 712/227
(58) Field of Search .......................... 702/182; 714/47, 714/30, 38; 712/227, 249; 364/200; 341/172; 348/594

(56) References Cited

U.S. PATENT DOCUMENTS

| | | |
|---|---|---|
| 5,187,796 A | 2/1993 | Wang et al. |
| 5,274,717 A | 12/1993 | Miura et al |
| 5,305,108 A | 4/1994 | Trytko |
| 5,530,809 A | 6/1996 | Douglas et al. |
| 5,590,337 A | 12/1996 | Rahman et al. |
| 5,699,506 A * | 12/1997 | Phillips et al. ................. 717/47 |
| 5,751,945 A | 5/1998 | Levine et al. |
| 5,768,610 A * | 6/1998 | Pflum ............................ 717/47 |
| 6,052,802 A * | 6/1998 | Zahir et al. .................... 717/47 |
| 5,797,019 A | 8/1998 | Levine et al. |
| 5,894,575 A | 4/1999 | Levine et al. |
| 5,896,538 A | 4/1999 | Blandy et al. |
| 5,919,268 A | 7/1999 | McDonald |
| 5,922,070 A | 7/1999 | Swoboda et al. |
| 6,000,044 A | 12/1999 | Chrysos et al. |

* cited by examiner

*Primary Examiner*—Kamini Shah
(74) *Attorney, Agent, or Firm*—Blakely, Sokoloff, Taylor & Zafman LLP

(57) ABSTRACT

An apparatus and method for cycle accounting for a microprocessor are disclosed, in which a performance monitor includes a plurality of silos, a prioritizer, and a combiner. The silos receive delay reason signals from the main processor pipeline, and output staged signals. The prioritizer receives the staged signals, and outputs a plurality of prioritized signals. The combiner selectively combines various of the prioritize signals, and provides signals indicative of microprocessor performance. Each silo includes, in series, a plurality of stages, with each stage containing a single latch. The stages of the silo are synchronized with the stages of the main processor pipeline. The performance monitor operates in real-time, at the same frequency as the microprocessor, and in parallel to the main processor pipeline, and correctly accounts for buffering effects of decoupling buffers. Outputted signals include various signals indicative of microprocessor performance, for example, cache misses, branch mispredictions, and so forth, but only for those miss-events that contribute to a program's visible delay, thereby providing an accurate picture of where cycles are being wasted.

52 Claims, 8 Drawing Sheets

APPARATUS AND METHOD FOR CYCLE ACCOUNTING IN MICROPROCESSORS

This is a continuation-in-part of U.S. patent application Ser. No. 09/001,309, entitled "Apparatus and Method for Cycle Accounting in Microprocessors", filed Dec. 31, 1997 by the inventors named herein now U.S. Pat. No. 6,052,802.

BACKGROUND OF THE INVENTION

1. Field of the Invention

This invention relates generally to computer microprocessors. More particularly, the present invention relates to an apparatus and method for monitoring the performance of a microprocessor in real-time, at the frequency of the microprocessor.

2. Description of the Related Art

Modem computers contain microprocessors, which are essentially the brains of the computer. Modern microprocessors use a design technique called a pipeline, in which the output of one process serves as input to a second, the output of the second process serves as input to a third, and so on, often with more than one process occurring during a particular computer clock cycle. Modern computers and computer microprocessors contain a number of pipelines, and each particular pipeline contains a number of stages.

A computer program contains numerous instructions, which tell the computer what precisely it must do, to achieve the desired goal of the program. A computer runs a particular computer program by executing the instructions contained in the program. Theoretically, an instruction should complete execution in a number of computer cycles equal to the number of pipeline stages contained in the computer. If it takes longer, there should be a reason for the extra cycles. It might be that the extra cycles occur because of how the microprocessor was designed, and how the microprocessor must operate. The extra cycles might occur because of how the computer program was designed, and how the computer program operates. If the extra cycles are caused by the computer program's design, that design might be altered to eliminate or at least reduce the number of extra cycles. Such redesigning of the computer program might be done by the program designer, or might be done by a compiler or other computer program which translates a higher-level computer program into lower-level instructions that can be executed by the computer. Such fine-tuning of a computer program, so as to eliminate or reduce extra cycles, requires identifying the cause or causes producing those extra cycles.

During program execution in a modem microprocessor pipeline, instructions often suffer execution delays because of cache misses, branch mispredictions, memory access delays, and so forth, each of which result in extra cycles, sometimes also called delay cycles. A detailed understanding of which types of delays are producing large numbers of delay cycles would allow the programmer, or the compiler or other software tuning tool, to modify the program's instruction stream so as to reduce the number of delay cycles and, as a result, cause the program to execute faster. A performance monitor is intended to provide such understanding.

Known prior art performance monitors monitor by simple counting the number of cache misses, branch mispredictions, and so forth. But not all such events contribute to a program's visible delay, due to parallel and super-scalar execution capabilities of today's processor pipelines, decoupling buffers used between multiple serial pipelines in today's processors to separate one pipeline from another, and so forth. For example, it is possible for a data cache miss to occur without causing a pipeline delay, if the use of the data happens long after the data actually is available for use. Consequently, simply counting the number of miss-events does not provide an accurate picture of where cycles are being wasted.

Some known prior art performance monitors include hardware counters that simply count certain events, such as data cache misses, in isolation without regard to whether or not the event counted actually produces a pipeline delay. In some known prior art performance monitors monitoring is done by software simulation. Such simulation is slow, and cannot be used effectively on present day and future processor pipelines capable of parallel and super-scalar execution.

The present invention tracks actual delay cycles in real-time, at the full frequency of the microprocessor, and is designed to work with advanced microprocessor architectures that feature speculative execution, pipelining, super-scalar execution, and/or decoupling buffers. Moreover, the present invention does not slow down the execution of the computer program's instruction stream, because the invention operates in parallel to the main processor pipeline. When implemented in the CPU hardware, the present invention eliminates the need for software simulation, and gives accurate, real-time breakdowns of processor stall cycles. This information may then be used by software for tuning operating systems and application programs. Examples of such software include Vtune™, a program commercially available from Intel Corporation, and pofile-guided compilers.

Thus the present invention is directed to overcoming, or at least reducing, the effects of one or more of the problems mentioned above.

SUMMARY OF THE INVENTION

In one aspect of the present invention, a performance monitor is provided for use in parallel with a main processor pipeline. The performance monitor includes one or more silos (a series of storage elements) which receive a plurality of delay signals from the pipeline, which delay signals indicate particular reasons for extra cycles being required.

The silos outputs certain signals, which are received by a prioritizer. The prioritizer prioritizes the signals it receives according to a particular prioritization scheme, and then outputs a number of prioritized signals. The prioritized signals are then received by a combiner which selectively combines the prioritized signals, and outputs signals providing relevant information, for example, the delay cycles actually caused by branch mispredictions, the delay cycles actually caused by execution latency, the delay cycles actually caused by data access delays, the delay cycles actually caused by instruction access delays, and so forth. The number of cycles in a particular signal can then be counted to give a total number of delay cycles for that particular reason for delay.

According to an aspect of the present invention, the prioritizing and the selective combining may be combined, may be performed in hardware, or may be performed under the control of programmable software. According to another aspect of the present invention, when the performance monitor has a single silo, there is no need for prioritizing and selected combining.

According to another aspect of the present invention, each silo has a number of individual stages, one stacked above the other. In one embodiment of the present invention, each stage includes a single latch. In another embodiment, instead of a latch a flip-flop is used. What is required is structure capable of storing a single bit, and thus any memory element or anything that is capable of storing information may be used. A silo as used in this patent is intended to encompass all such structure. Each silo receives one or more of the delay reason signals provided by the main processor pipeline, and outputs a staged signal. The staged signal from each of the silos are the signals received by the prioritizer.

According to another aspect of the present invention, the number of stages in a particular silo is directly related to the position in the microprocessor pipeline of the pipeline stage producing a particular delay signal. The main processor pipeline includes a number of pipeline stages, including an ith stage and a jth stage, and this jth stage may provide one or more jth delay reason signals. In the pipeline, K stages separate the ith stage of the pipeline from the jth stage (not counting either the ith stage or the jth stage). One of the silos of the performance monitor has K+1 stages, that is, one more stage than the number of stages separating the ith stage and the jth stage of the pipeline, and, a jth delay reason signal from the jth stage of the pipeline is provided to the top-most stage, that is, the K+1st stage, of this silo. According to another aspect of the present invention, one of the silos has more than K+1 stages, and the jth delay reason signal from the pipeline is provided to the K+1st stage of the silo, and to each stage of the silo above the K+1st stage to the top of that silo. According to yet another aspect of the present invention, the number of stages in a particular silo is one less Man the number of stages from the beginning of the pipeline to the last stage in the pipeline where a delay can occur, and ajth delay reason signal is provided to all the stages in that silo.

According to another aspect of the present invention, cycle accounting for a microprocessor includes receiving certain of the delay reason signals, staging each of the received signals and outputting staged signals, prioritizing the staged signals and outputting prioritized signals, and selectively combining the prioritized signals and outputting signals. According to one aspect of the present invention, the cycle accounting is carried out at the frequency of the microprocessor. According to another aspect of the present invention, the cycle accounting is carried out in parallel to the microprocessor pipeline. And according to yet another aspect of the present invention, the cycle accounting continues to be carried out when the microprocessor pipeline experiences delays.

According to still another aspect of the present invention, a delay cycle accounting system is provided. The system includes a main processor coupled to a performance monitor. The processor includes a pipeline which operates in parallel to the performance monitor. The performance monitor is coupled to the pipeline, and includes one or more silos, each of which receives at least one of a plurality of delay reason signals provided by the pipeline. Each silo outputs a staged signal, and all such staged signals are received by a prioritizer. The prioritizer selectively prioritizes the staged signals it receives, and outputs at least two prioritized signals, at least one of which is a logical combination of at least two of the staged signals. A combiner receives the prioritized signals, and outputs at least one signal that is a logical combination of at least two of the prioritized signals. A counter receives this signal and counts the number of cycles the condition has occurred, and outputs a signal indicating this cycle count.

The present invention can deal with overlapping delays, such as overlapping stall conditions, delays that cause multiple pipeline effects, such as multi-cycle bubbles, flushes resulting from branch mispredictions, and so forth, and delays caused in decoupling buffers and elsewhere. The present invention is not limited to any particular microprocessor, and can readily be implemented for different instruction sets and pipeline microarchitectures that support speculative execution and super-scalar instruction execution.

The present invention is of significance importance to future microprocessors, because as microprocessor pipelines become deeper, faster, and wider, and the relative speed of memory becomes slower, detailed performance analysis becomes increasingly important. The present invention enables real-time break-down of program execution time, and allows measurement and analysis of performance bottlenecks on complex software systems in real-time. Large complex workloads, such as computer operating systems and databases, which cannot readily be simulated, can be effectively optimized using the present invention. These and other benefits will become evident as the present invention is described more fully below.

BRIEF DESCRIPTION OF THE DRAWINGS

Other objects and advantages of the invention will become apparent upon reading the following detailed description and upon reference to the drawings in which.

Figure 1:
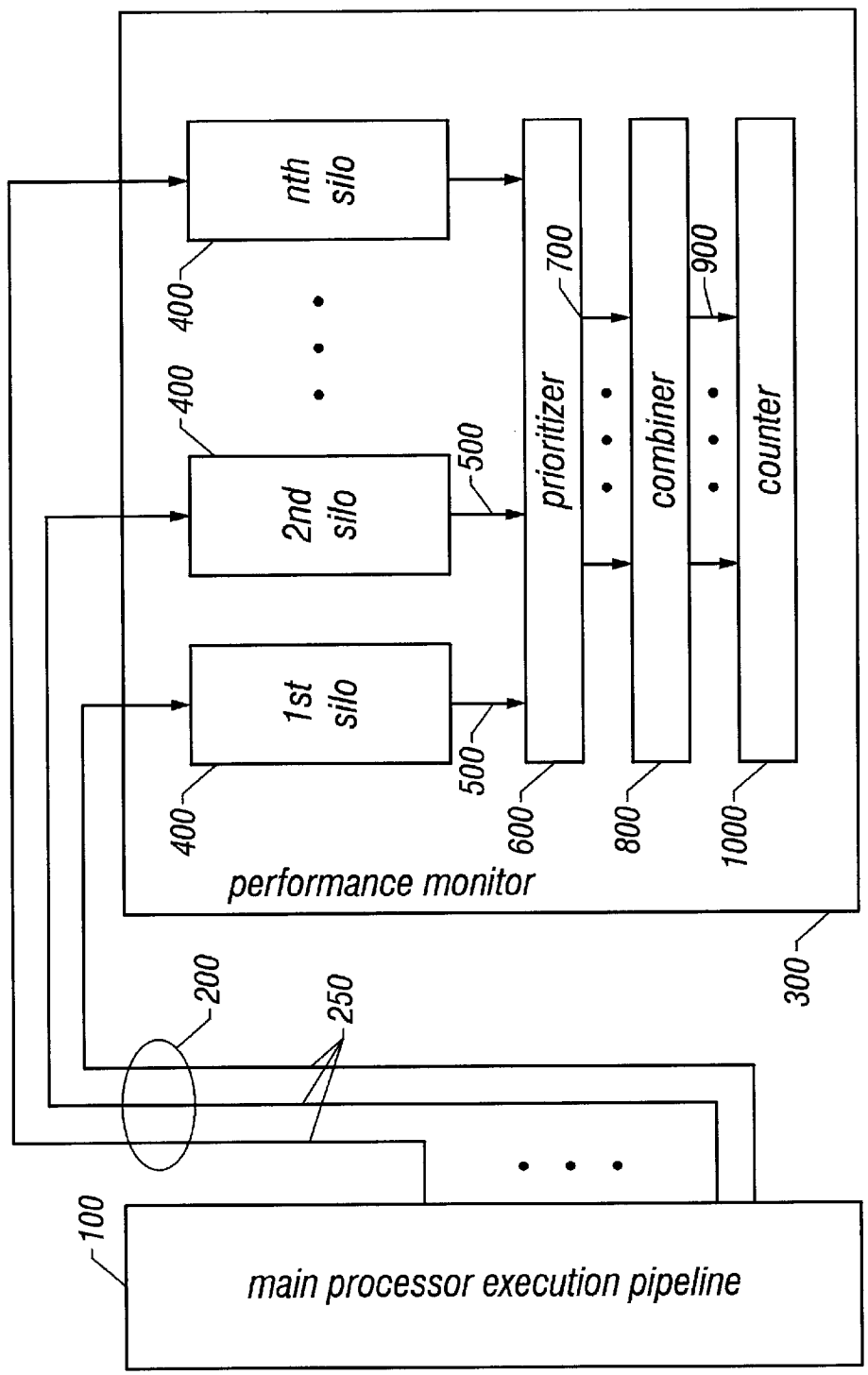
FIG. 1 is a schematic block diagram of a delay cycle accounting system according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, there is shown in block diagram form a main processor pipeline 100 which provides a plurality of delay reason signals 200, over a plurality of lines 250, to a performance monitor 300. The performance monitor includes a plurality of silos 400. Each silo receives one or more of the plurality of delay reason signals 200, and outputs a staged signal, over one of a plurality of lines 500, to a prioritizer 600. The prioritizer receives the stage signals, prioritizes them, and outputs a plurality of prioritized signals, via a plurality of lines 700, to a combiner 800. The combiner selectively combines various ones of the prioritized signals, and outputs one or more signals via one or more lines 900. A counter 1000 receives at least one signal, counts the number of cycles contained in that signal, and outputs a signal indicating that cycle count.

In advanced microprocessor architectures that feature speculative execution, pipelining, super-scalar execution, and/or decoupling buffers, various types of delay cycles exist, for example, simple pipeline stalls that inject a single bit into a silo of the present invention, pipeline bubbles that inject a number of bits into a silo of the present invention, and pipeline flushes that inject a large number of bits into a silo of the present invention.

A stall, in general, is a signal which, if asserted to a pipeline stage, requires that the stage not update its output state, that any data fed forward to the next stage is invalidated, and, when the signal is disasserted (signals are either asserted or disasserted), that the output state is updated as if the stall signal was never asserted. A flush, in general, is a signal which, if asserted to a pipeline stage, requires that either the stage invalidate its output state or the output state be ignored by all receivers, and, when the signal is retired, that the output state is updated as if the flush signal was never asserted. The flush signal is unlike the stall signal in that often the stage may not have to deal with invalid incoming data for several clock cycles.

Theoretically, an instruction should complete execution in a number of cycles corresponding to the number of pipeline stages in the microprocessor. If it takes longer, then there should be a reason for the extra cycles. By the time an instruction retires, it has experienced all of the delays which it is going to experience. Consequently, any effect which causes an instruction to retire more than the number of pipeline stages after it was fetched is considered a delay. These effects may be directly attributable to the current instruction, or they may be a function of a previous instruction. There are several events which occur during an instruction's path through the pipeline which can cause its issue to be delayed, and these events can happen at many different clock cycles.

Various types of delays and examples will now be described. Although these examples are given for consecutive operations, the conditions can exist between arbitrary operations fetched in the same clock cycles as the two operations, called "op1" and "op2", in the examples. The clear boxes represent cycles without any delays for the given instruction; the shaded boxes represent cycles during which a delay is detected.

The normal flow of two instructions in a particular microprocessor pipeline is shown below.

| clock | 1 | 2 | 3 | 4 | 5 | 6 | 7 | 8 | 9 |
|---|---|---|---|---|---|---|---|---|---|
| op1 | FE1 | FE2 | BUF | DEC | IS | RR | EX1 | EX2 | WB |
| op2 | FE1 | FE2 | BUF | DEC | IS | RR | EX1 | EX2 | WB |

FE1 - Instruction Fetch 1 stage
FE2 - Instruction Fetch 2 stage
BUF - Instruction Buffer stage
DEC - Instruction Decode stage
IS - Instruction Issue stage
RR - Register Read stage
Instruction Issue
EX1 - Instruction Execution 1 (non-memory ops) stage
M0 - L0 Memory Pipe (memory ops)
M1 - L1 Memory Pipe (memory ops)
EX2 - Instruction Execution 2 stage
WB - Write Back (Retire) stage Various delays may include:

Instruction Cache Delay:

An instruction cache delay occurs when an instruction does not exist in the instruction cache. This delay can last for an undetermined number of cycles (however long it takes to load the instruction into the cache). In the following example, the second instruction incurs a five cycle penalty due to an I-cache miss (clocks 3–7).

| clock | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| opt1 | FE1 | FE2 | BUF | DEC | IS | RR | EX1 | EX2 | WB | | | | | |
| opt2 | FE1 | FE2 | FE2 | FE2 | FE2 | FE2 | FE2 | BUF | DEC | IS | RR | EX1 | EX2 | WB | counted delay

Fetch Window Delay:

A processor has limited bandwidth to the instruction cache. Every time the program's execution path crosses the cache line boundary, the next instruction's fetch is delayed for one cycle. This translates into a one cycle delay in issue.

Taken Branch Delay:

Any time a branch is taken, the target instruction is delayed for one cycle from the optimal case. The optimal case is that both the branch and its target are fetched in the same cycle, in which case there would be no penalty. The microprocessor having the pipeline illustrated above does not allow multiple non-consecutive lines to be fetched per cycle, so there is a one cycle penalty for the taken branch. This is similar to the fetch window delay, except that this is for out-of-line accesses.

Dynamic Branch Bubble:

In the ideal case, the dynamic branch predictor could instantaneously determine the next address. If the next address is in-line, no action is taken, and so no penalty occurs. If the next address is not in-ine, whatever time has been spent making the dynamic prediction has been lost. For the illustrated pipeline, two cycles are lost.

Static Taken Branch Bubble:

The static branch bubble is directly analogous to the dynamic branch bubble. The static prediction, however, is made in the instruction buffer (BUF) stage, and for the illustrated pipeline three cycles are lost.

Branch Mispredict/Serialization:

A mispredicted branch is redirected after the instruction execution 2 (EX2) stage. Consequently, all of the cycles between op1's fetch and its EX2 stage are lost. If the branch is taken, then one of these cycles is due to the taken branch penalty, and the remaining eight cycles are due to a branch mispredict.

Execution Pipe Delay:

When two operations have a data dependency, and the first operation has a non-unit latency, the second operation may be held up in the register read (RR) stage waiting for the data to become available.

Data Cache Miss Delay:

When two operations have a data dependency, and the first operation is a load, and it misses in the data cache, the second operation will wait in the register read (RR) stage until the data is retrieved from the cache hierarchy. This stall is also detected elsewhere, but it is only counted after op1 has finished going through the data cache. Thus, execution delays and data cache miss delays are distinct for any one instruction.

Figure 2:
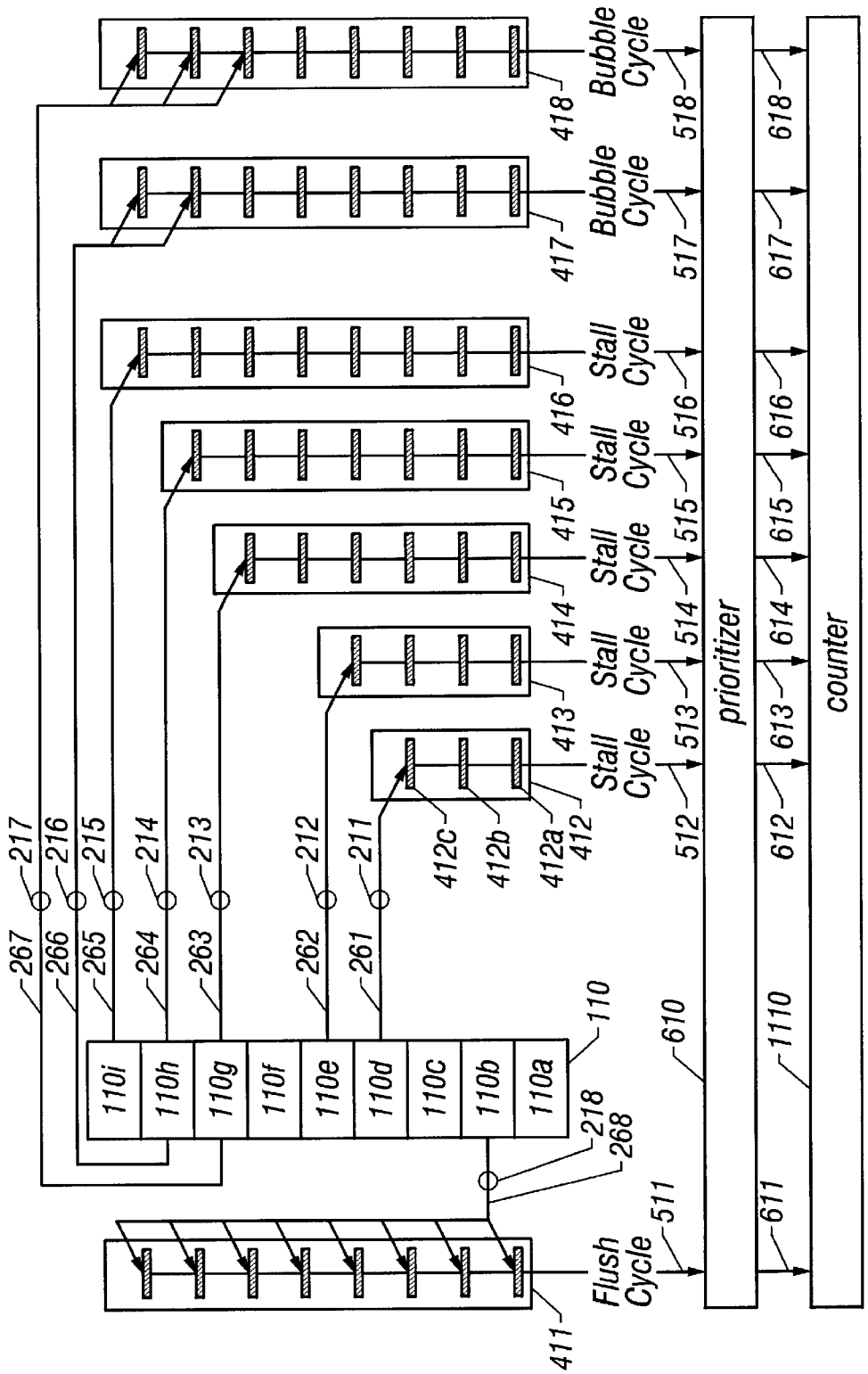
FIG. 2 is a schematic diagram of a delay cycle accounting system according to one embodiment of the present invention.

Referring now to FIG. 2, in one embodiment of the present invention, a main processor pipeline 110 includes nine stages, 110a, 110b, 110c, . . . , 110i. The pipeline begins at the stage 110i, and ends at the stage 110a.

The illustrated embodiment includes eight silos, 411, 412, 413, . . . , 418. Each silo includes, in series, a plurality of stages, with each stage including a single latch. For example, the silo 412 includes three latches, 412a, 412b, and 412c; the latch 412a is the bottom-most latch in the silo 412, and the latch 412c is the top-most latch.

For ease in illustration and description in this patent, the beginning stage of a pipeline and of a silo has been illustrated as, and described as, the top-most stage, and the end stage has been illustrated as, and described as, the bottom-most stage. As is apparent, top-most is merely a first or earlier stage, and bottom-most is merely an end or later stage. The stream of flow is from the top-most stage to the bottom-most stage. Hence with reference to any particular stage, up-stream means closer to the top-most stage, and down-stream means closer to the bottom-most stage.

Various of the stages 110a–110i of the pipeline 110 provide one or more delay reason signals to various of the silos. Three types of delay cycles are illustrated: simple pipeline stalls; pipeline bubbles; and pipeline flushes.

Simple pipeline stalls are pipeline delays that inject a single bit into a silo, where that silo contains as many latches as the pipeline boundary that is being stalled is removed from the stage 110a of the pipeline, as described more fully below. If a simple stall lasts for multiple cycles, multiple consecutive stall bits are inserted into the silo.

For example, the stage 110d of the pipeline 110, provides a delay reason signal 211, via a line 261, to the top-most latch 412c of the silo 412. The stage 110d of the pipeline 110 is separated from the bottom-most stage of the pipeline, stage 110a, by two stages, namely stages 110b and 110c; consequently, the stage 110d is the third stage above the bottom-most stage 110a of the pipeline 110. The delay reason signal 211 from that stage 110d is therefore provided by a pipeline stage that is the third stage above the pipeline's bottom-most stage. Consequently, the silo that receives the delay reason signal 211 must have three stages; that is, the number of stages in the silo receiving the delay reason signal must be one more than the number of stages contained in the pipeline between the pipeline stage producing the delay reason signal and the bottom-most stage of the pipeline.

Similarly, the stage 110e of the pipeline 110, provides a delay reason signal 212, via a line 262, to the top-most latch in the silo 413; because there are three pipeline stages between the stage 110e providing the delay reason signal 212 and the bottom-most stage 110a of the pipeline, the silo 413 has four latches. The delay reason signals 213, 214, and 215 are similarly provided from the pipeline stages 110g, 110h, and 110i, to the top-most latches in the silos 414, 415, and 416, via the lines 263, 264, and 265, respectively.

Pipeline bubbles are pipeline delays that last for more than one cycle. For example, a dynamic branch bubble introduces two dead cycles into a processor pipeline, and a static branch bubble introduces three dead cycles. Such bubbles result in more than one latch in a silo being set every time such a bubble condition occurs. In general, a two cycle pipeline bubble injects two bits into the delay accounting silo, a three cycle pipeline bubble injects three bits, a four cycle pipeline bubble injects four bits, and so forth.

Illustrated in the embodiment of FIG. 2, are a two cycle pipeline bubble, and a three cycle pipeline bubble. The stage 110h of the pipeline 110 provides a two bit bubble signal 216 to the silo 417, via a line 266. A two bit branch bubble delay signal results in the two top-most latches in a silo being set every time that bubble condition occurs. Consequently, the delay reason signal 216 is fed to the two top-most latches in the silo 417.

The stage 110g of the pipeline 110 provides a three bit bubble signal 217 to the silo 418, via a line 267. A three bit branch bubble delay signal results in the three top-most latches in a silo being set every time the condition occurs. Consequently, the delay reason signal 217 is fed to the three top-most latches in the silo 418.

Pipeline flushes are pipeline delays that flush multiple pipeline stages, for example, branch mispredictions. When such delays occur, bits are injected into every silo latch that corresponds to a flushed pipeline stage. In general, flushes that flush "x" pipeline stages, inject "x" bits into the delay accounting silo.

The embodiment illustrated in FIG. 2 contains one pipeline flush. The stage 110b of the pipeline 110, provides a eight bit flush delay signal 218, via a line 268, to the silo 411.

Note that in the case of a one cycle delay signal, the delay signal is injected into the top-most stage of a silo, and the silo has a number of stages equal in number to one more than the number of stages between the pipeline stage providing the delay reason signal and the bottom-most stage of the pipeline, that is, the pipeline stage where the architectural state is being committed, sometimes called the write back stage (shown as stage 110a in FIG. 2). For a two cycle delay signal, the delay signal is injected into the two top-most stages of a silo, and the silo has a number of stages equal in number to two more than the number of stages between the pipeline stage providing the delay reason signal and the write back stage. For a three cycle delay signal, the delay signal is injected into the three top-most latches of a silo, and the silo has a number of stages equal in number to three more than the number of stages between the pipeline stage providing the delay signal and the write back stage. Thus, for an "n" cycle delay signal, the signal is injected into the "n" top-most stages of a silo, and the silo has a number of stages equal in number to "n" more than the number of stages between the pipeline stage providing the delay signal and the write back stage of the processor.

With continued reference to FIG. 2, the staged signals outputted from the silos 411, 412, . . . 418 are provided to a prioritizer 610 via a plurality of lines 511, 512, . . . , 518. The prioritizer 610 provides output signals to a counter 1110. For example, in the illustrated embodiment of FIG. 2, the staged signal from the silo 411 contains flush cycle information. It is provided via the line 511 to the prioritizer 610, which in turn outputs a signal (described more fully below) on a line 611. This signal on the line 611 is received by the counter 1110 which counts the number of cycles in the signal, thereby providing the number of cycles during which a flush condition has been asserted. For a single flush lasting eight cycles, the number counted is eight. Similarly, for a single bubble lasting three cycles the number is three, for two bubbles each lasting three cycles, the number is six, and so forth.

Figure 3A:
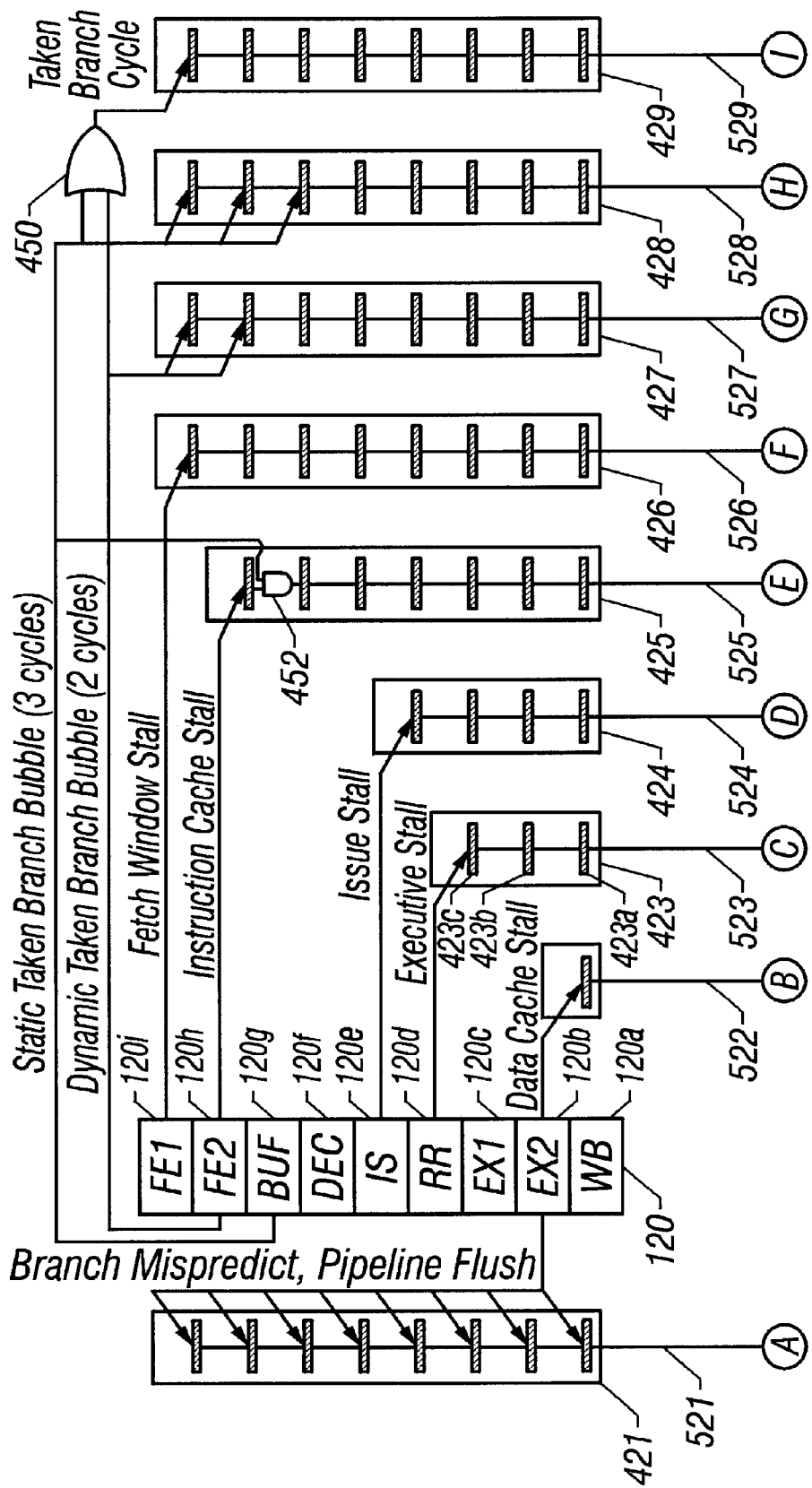
FIG. 3 is a schematic diagram of a delay cycle accounting system according to another embodiment of the present invention.
Figure 3B:
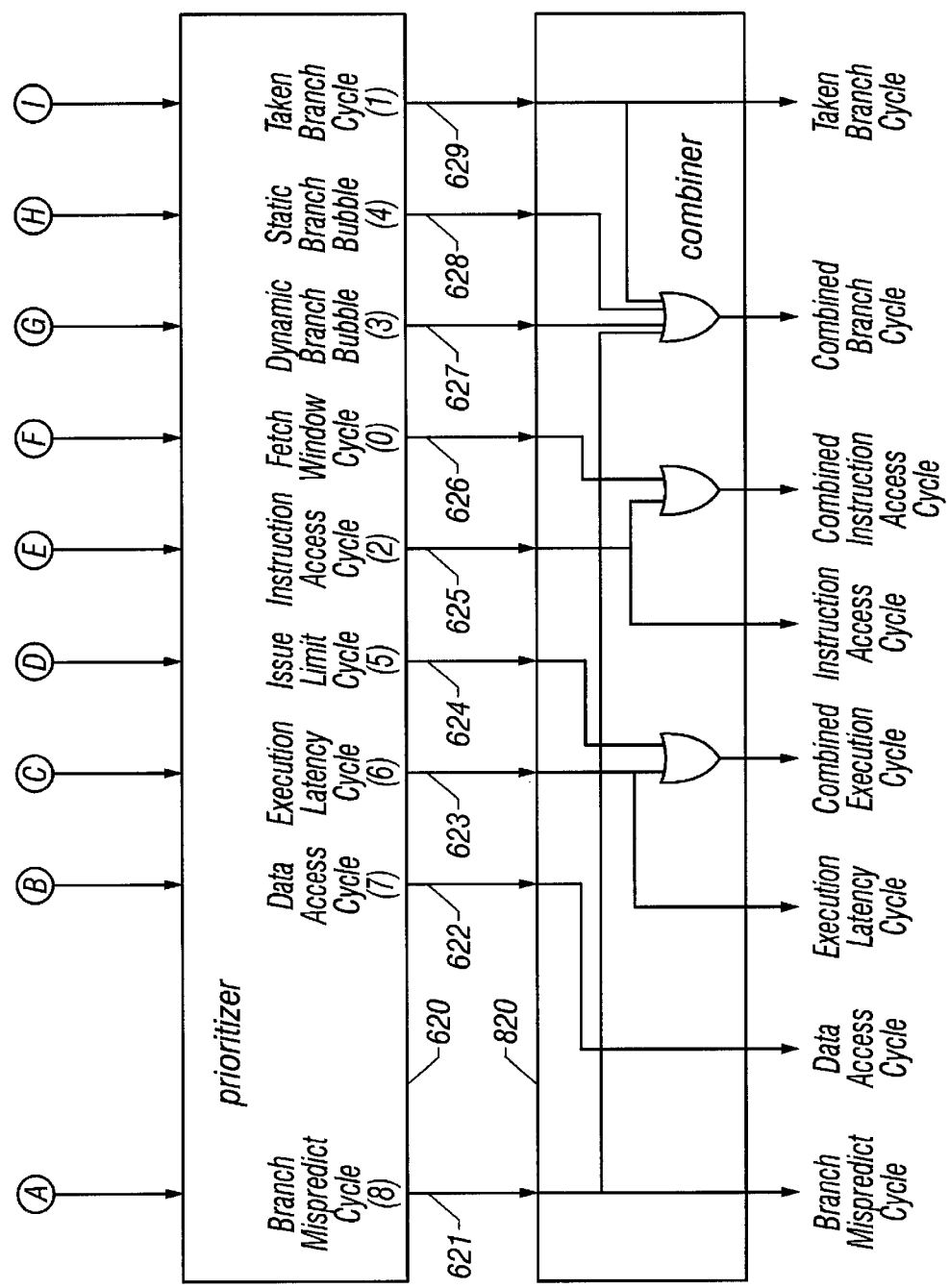

Referring now to FIG. 3, in another embodiment of the present invention, a main process pipeline 120 includes nine stages, 120a, 120b, 120c, . . . ,120i. The stage 120a is a write back (WB) stage, the stage 120b is an instruction execution 2 (EX2) stage, and the stage 120c is an instruction execution 1 (EX1) stage. Stages 120d–120i are a register read (RR) stage, an instruction issue (IS) stage, an instruction decode (DEC) stage, an instruction buffer (BUF) stage, an instruction fetch 2 (FE2) stage, and an instruction fetch 1 (FE1) stage, respectively. The illustrated pipeline begins with the instruction fetch 1 (FE1) stage 120i, which delivers an instruction pointer to the instruction cache. The pipeline ends with the write back (WB) stage 120a; once an instruction completes the write back stage of the illustrated pipeline, it is guaranteed to update the architectural processor state. The stream of flow is from the instruction fetch 1 stage 120i to the write back stage 120a; consequently, with reference, for example, to the BUF stage 120g, the stages 120f, 120e, 120d, 120c, and 120b are progressively farther down-stream, and the stages 120h and 120i are progressively farther up-stream. All of the delay reason are prioritized after the write back stage, before being counted to sort out major performance penalties.

With continued reference to FIG. 3, the illustrated embodiment includes nine silos, 421, 422, . . . , 429. Each silo includes one or more latches. For example, the silo 423 includes three latches, 422a, 422b, and 422c, and the silo 422 includes a single latch.

Various of the stages 120a–120i of the pipeline 120 provide one or more delay reason signals to various of the silos 421–429, via a plurality of delay signal lines.

Examples of simple pipeline stalls are illustrated in FIG. 3. These include the read register (RR) stage 120d of the pipeline 120 injecting a single bit into the silo 423, the instruction issue (IS) stage 120e injecting a single bit into the silo 424, the fetch instruction 2 (FE2) stage 120h injecting a single bit into the silo 425, the instruction fetch 1 (FE1) stage 120i injecting a single bit into the silo 426, and the instruction execution stage 2 (EX2) injecting a single bit into the one latch stage silo 422.

The register read (RR) stage 120d of the pipeline 120 is separated from the write back stage 120a, by two stages (stages 102b and 102c); consequently, the register read stage 102d is the third stage above the write back stage 102a. The register read stage provides an "Execution Stall" signal to the top-most latch of the silo 423. Because this stall signal is provided from the stage in the pipeline located three stages before the write back stage, the silo 423 requires three stages of latches. Similarly, the delay reason signal from the instruction issue (IS) stage 120e of the pipeline to the top-most latch in the silo 424, comes from the stage of the pipeline located four stages above the write back stage 120a and, consequently, the silo 424 requires four latch stages.

Pipeline bubble delays are also illustrated in the FIG. 3 embodiment. For example, a "Static Taken Branch Bubble (3 cycles)" signal, from the pipeline stage 120g, is coupled to the three top-most latches of the silo 428. And, a "Dynamic Taken Branch Bubble (2 cycles)" signal, from the pipeline stage 120h, is coupled to the two top-most latches of the silo 427.

Delay signal may be coupled to more than one silo. For example, the signal from pipeline stage 120g, in addition to being coupled to the silo 428, is also coupled, via logic, to the top-most latch of the silo 429 and to the second-from-the top latch in the solo 425. An OR gate 450 receives the "Static Taken Branch Bubble (3 cycles)" signal, from the pipeline stage 120g, and the "Dynamic Taken Branch Bubble (2 cycles)" signal, from the pipeline stage 120h. The output of the OR gate 450 is injected into the top-most latch of silo 429, and silo 429 outputs a staged "Taken Branch Cycle" signal that qualifies dynamic and static branch bubbles. An AND gate 452 receives the "Static Taken Branch Bubble (3 cycles)" signal and the output of the top-most latch of the silo 425. The output of the AND gate 452 is injected into the second-from-the-top latch of the silo 425.

A pipeline flush is also illustrated in the FIG. 3 embodiment. A "Branch Mispredict, Pipe Flush" signal, from the instruction execution 2 (EX2) stage 120b, injects a bit into every latch in the silo 421.

Multiple delay cycles often occur, in real-world processes, at the same time in different stages of the pipeline. Delays are often data dependent, and can last for a variable number of cycles. This results in stalls overlapping each other in time, and makes it difficult to identify specific reasons for a particular delay cycle. To solve this problem, one particular embodiment of the present invention uses a static prioritization scheme in which delay cycles that occur closer to the architectural commit or write back stage (WB) 120a of the processor pipeline 120 illustrated in FIG. 3, are given priority over delay cycles that are introduced in earlier stages, that is, further away from the write back stage.

With continued reference to FIG. 3, a prioritizer 620 includes a number of logic gates which receive various staged delay signals, including possibly multiples of particular signals, from the silos 421–429. The prioritizer 620 prioritizes the incoming staged signals into prioritized delay cycle signals "Branch Mispredict Cycle (8)", "Data Access Cycle (7)", "Execution Latency Cycle (6)", "Issue Limit Cycle (5)", "Static Branch Bubble (4)", "Dynamic Branch Bubble (3)", "Instruction Access Cycle (2)", "Taken Branch Cycle (1)", and "Fetch Window Cycle (0)". Priorities are indicated by the numbers 8, 7, . . ., 0, with 8 being the highest priority and 0 the lowest.

The illustrated prioritizer 620 has a left-to-right static prioritization scheme that, in the case of concurrent delay cycles, has the left-to-right prioritization indicated in the block 620. That is, "Branch Mispredict Cycle (8)" has the highest priority of 8, and "Fetch Window Cycle (0)" has the lowest priority of 0. The output of the illustrated prioritizer 620 is "one-hot", which means that in every cycle at most only one of the output signals of the prioritizer will be asserted (that is, will be true). In any cycle in which none of these prioritized delay cycle indicator signals are true, there is no pipeline condition that is delaying the computation, and the pipeline is operating at full efficiency.

Figure 4:
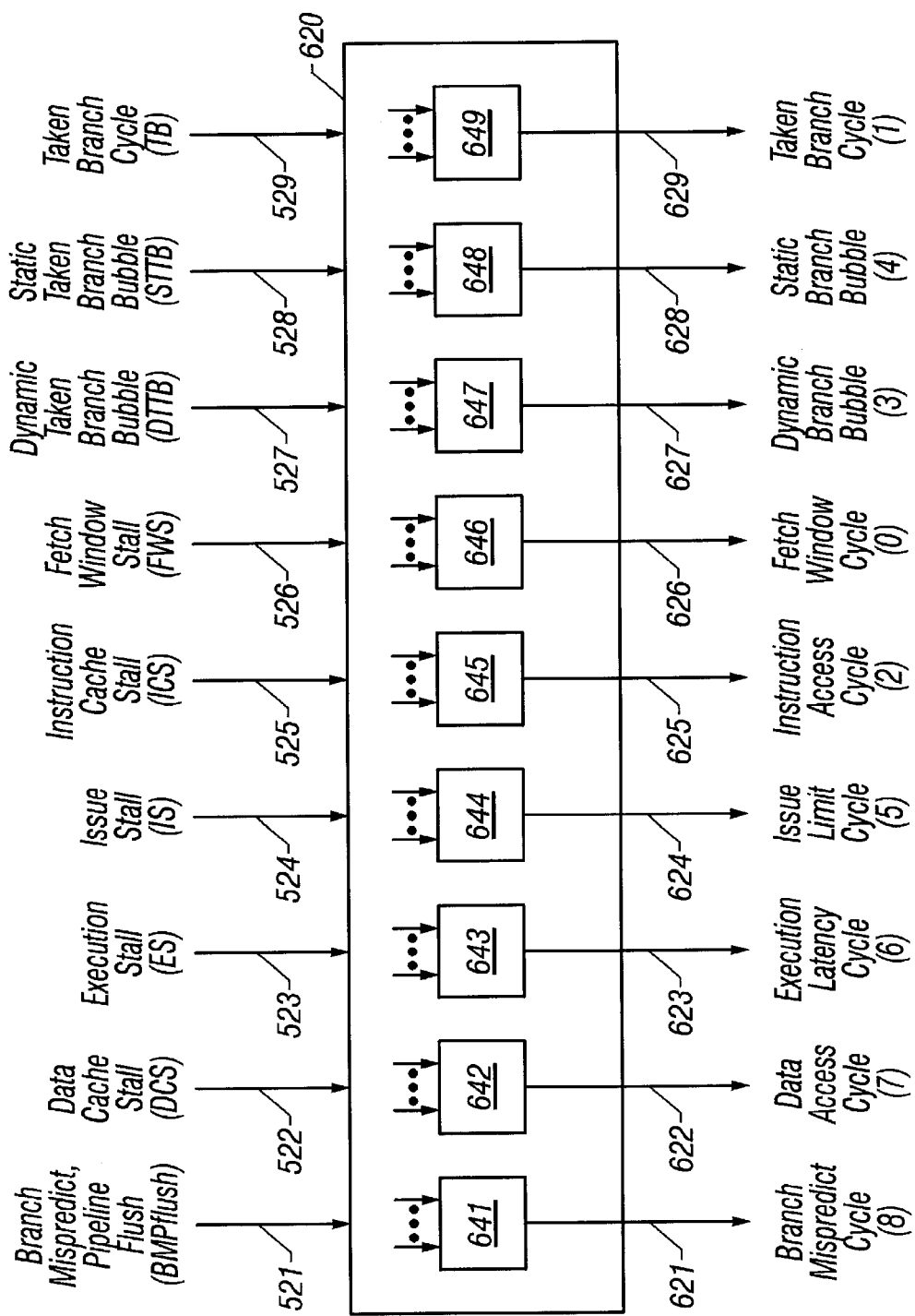
FIG. 4 is a block diagram illustrating various aspects of a prioritizer included in the embodiment of the invention illustrated in FIG. 3.
Figures 5A, 5B, 5C:
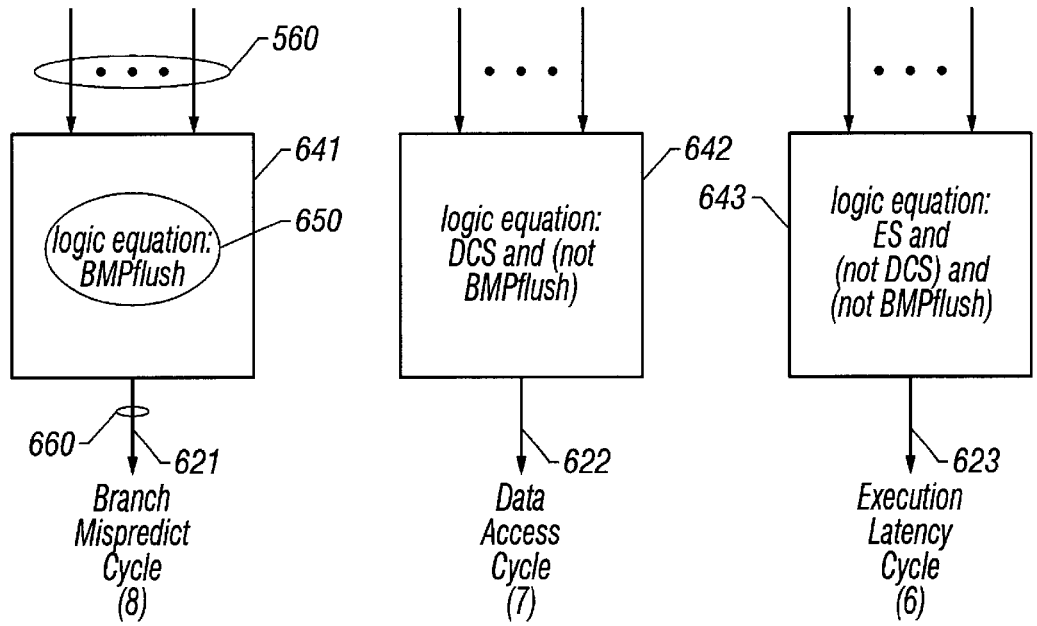
FIG. 5a–5i illustrate various details of the prioritizer illustrated in FIG. 4, according to one embodiment of the present invention.
Figures 5D, 5E, 5F:
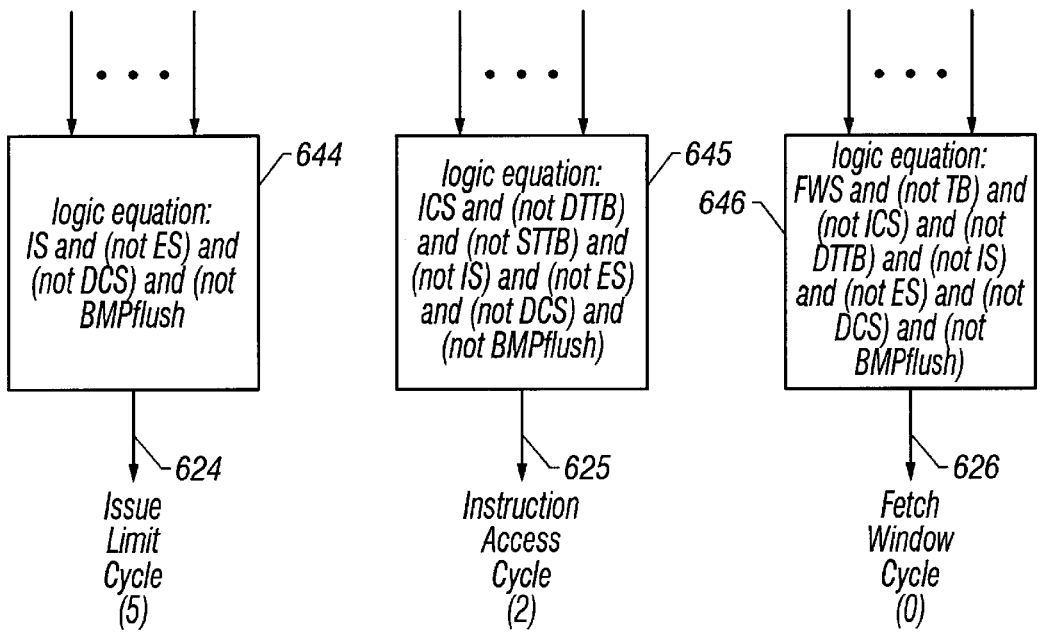

Referring now to FIG. 4, the prioritizer 620 receives various staged stall and flush signals from the silos 421, 422, . . . , 429 via lines 521, 522, . . . , 529, and outputs prioritized signals via lines 621, 622, . . . , 629, respectively. The prioritizer 620 includes various circuitry which may conveniently be grouped as circuit units 641, 642, . . . , 649. Referring now to FIG. 5a, in general each circuit unit receives one or more input signals 560 and outputs a signal 660, transforming the input signals 560 to the output signal 660 by performing the operations defined by a logic equation 650. As is apparent, any circuitry can be used, as desired, to carry out the logic of the logic equation 650.

Figures 6, 7:
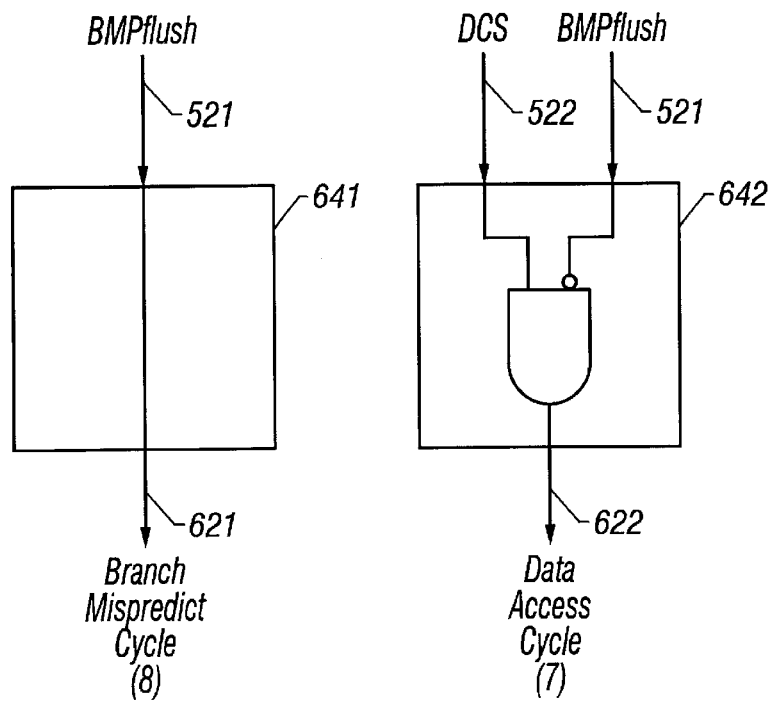
FIGS. 6, 7, and 8 illustrate still further details of the prioritizer illustrated in FIG. 4, according to one embodiment of the present invention.

For example, referring to FIGS. 4, 5b, and 7, the circuit unit 642 receives the "Data Cache Stall" signal (abbreviated "DCS"), from the silo 422 via the line 522, and the "Branch Mispredict, Pipeline Flush" signal (abbreviated "BMPflush"), from the silo 421 via the line 521. The logic equation for the circuit unit 642 in "DCS and (not BMPflush)" as illustrated in FIG. 5b. Sample logic circuitry to transform the DCS signal and the BMPflush signal to the desired output signal on the line 622 is illustrated in FIG. 7. Similarly, FIG. 6 illustrates sample circuitry (a straight-through connection) to transform the single input signal to the circuit unit 641 via the line 521 from the silo 421, to produce the desired output signal on the line 621, using the logic equation for the circuit unit 641..

With continued reference to FIG. 4, the various inputs signals to the prioritizer 620 from the silos 421, 422, . . . , 429, via the lines 521, 522 ,. . . , 529, are identified Table 1, along with

TABLE 1

| Symbolic Name | Output from Silo/ Input to Prioritizer |
|---|---|
| BMPflush | Branch Mispredict, Pipe Flush |
| DCS | Data Cache Stall |
| ES | Execution Stall |
| IS | Issue Stall |
| ICS | Instruction Cache Stall |
| FWS | Fetch Window Stall |
| DTTB | Dynamic Taken Branch Bubble |
| STTB | Static Taken Branch Bubble |
| TB | Taken Branch Cycle | a symbolic name or abbreviation for each staged input signal. Table 2 reflects the prioritization scheme for the prioritizer 620, and lists the output signals of the prioritizer in descending

TABLE 2

| Priority | Symbolic Name | Output from Prioritizer |
|---|---|---|
| 8 | BMC(8) | Branch Mispredict Cycle (8) |
| 7 | DAC(7) | Data Access Cycle (7) |
| 6 | ELC(6) | Execution Latency Cycle (6) |
| 5 | ILC(5) | Issue Limit Cycle (5) |
| 4 | SBB(4) | Static Branch Bubble (4) |
| 3 | DBB(3) | Dynamic Branch Bubble (3) |
| 2 | IAC(2) | Instruction Access Cycle (2) |
| 1 | TBC(1) | Taken Branch Cycle (1) |
| 0 | FWC(0) | Fetch Window Cycle (0) | priority order, along with a symbolic name or abbreviation for each prioritized output signal. Table 3 sets forth the logic equations needed to produce the desired prioritized output signals

TABLE 3

| Output Signal | Logic Equation |
|---|---|
| BMC(8) = | BMPflush |
| DAC(7) = | DCS and (not BMPflush) |
| ELC(6) = | ES and (not DCS) and (not BMPflush) |
| ILC(5) = | IS and (not ES) and (not DCS) and (not BMPflush) |
| SBB(4) = | (STTB and (not TBC)) and (not IS) and (not ES) and (not DCS) and (not BMPflush) |
| DBB(3) = | (DTTB and (not TB)) and (not STTB) and (not IS) and (not ES) and not (DCS) and (not BMPflush) |
| IAC(2) = | ICS and (not DTTB) and (not STTB) and (not IS) and (not ES) and (not DCS) and (not BMPflush) |
| TBC(1) = | TB and (not ICS) and (not IS) and (not ES) and (not DCS) and (not BMPflush) |
| FWC(0) = | FWS and (not TB) and (not ICS) and (not DTTB) and (not STTB) and (not IS) and (not ES) and (not DCS) and (not BMPflush) | from various of the staged input signals. FIG. 5c through 5i illustrate the circuit units 643, 644, . . . , 649, the logic equation for each such unit, and the desired output for each such unit, in the same manner as FIGS. 5b and 5a do for circuit units 642 and 641, respectively, as described above.

Figures 5G, 5H, 5I:
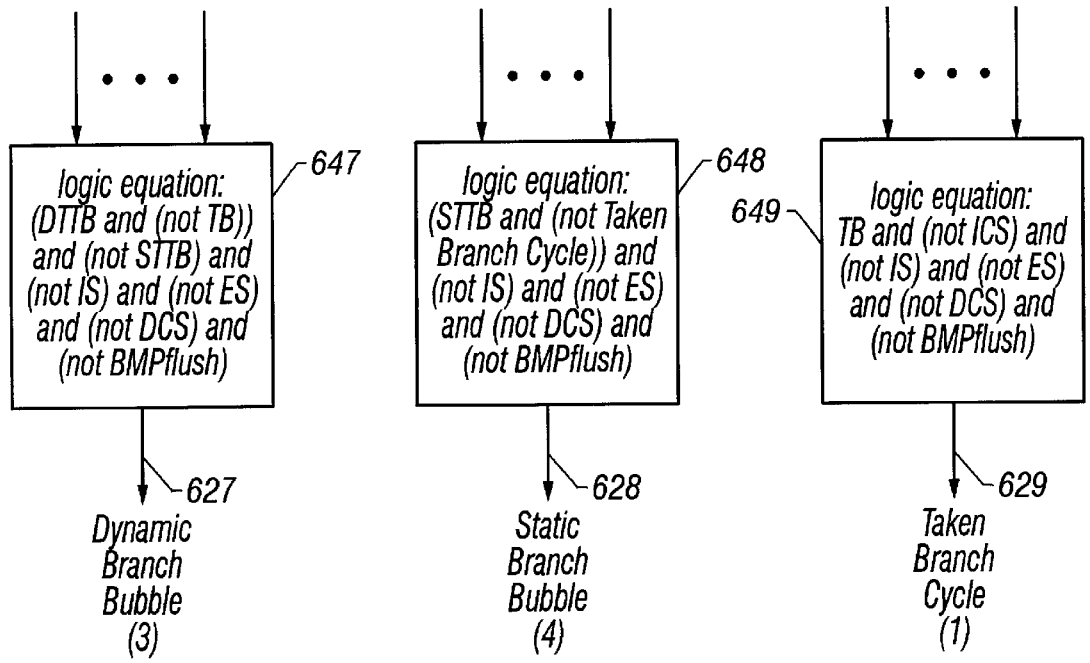
Figure 8:
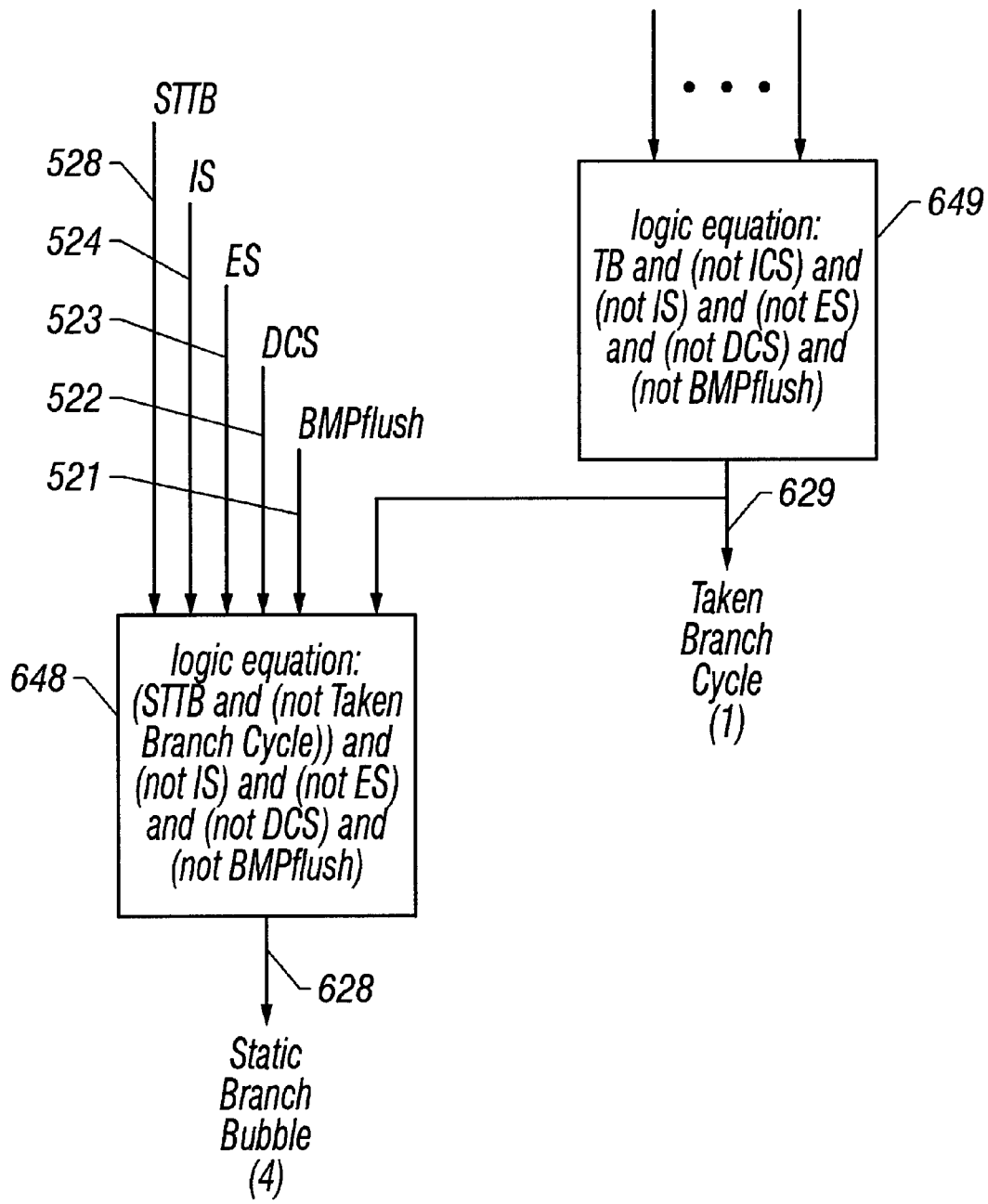

The prioritization scheme might be implemented in such a way that the output of a particular circuit unit serves as an input to another circuit unit. In the illustrated embodiment of FIGS. 3 and 4, the output signal of the circuit unit 649, illustrated in FIG. 5i, is one of the input signals to the circuit unit 648, illustrated in FIG. 5h. This is best illustrated in FIG. 8, where each of the six signals received by the circuit unit 648 are illustrated.

Prioritization schemes different from the one illustrated in FIGS. 3, 4, and 5a–5i may be used, including programmable logic. With a different prioritization scheme, different logic equations are of course needed to transform the available staged input signals into the desired prioritized output signals. As will also be apparent to those skilled in the art having benefit of this disclosure, the present invention may advantageously be used with different pipelines, with a prioritization scheme and logic equations appropriate for the selected pipeline. In the illustrated embodiment, in any particular clock cycle only one of the nine illustrated prioritized delay cycle indicator signals may be true. In another embodiment, one or more may be true.

The pipeline 120 illustrated in FIG. 3 includes a single decoupling buffer stage, BUF, stage 120g. When a decoupling buffer in the main processor pipeline fills up due to later down-stream pipeline stalls, the buffer looses its buffering capability, and delay cycles from earlier up-stream pipeline stages become visible to the program. The delay cycle logic illustrated in FIG. 3 correctly accounts for the buffering effects of the decoupling buffer in the BUF stage 120g, because when the buffer is full, at least one of the down-stream delay signals ("Issue Stall" from the stage 120e, "Execution Stall" from the stage 120d, or "Data Cache Stall" from the stage 120b in the illustrated embodiment)

will be asserted. Subsequent prioritization of the staged delay signals ensures that delay signals from later stages are prioritized over ones from early stages. Consequently, even though earlier pipeline stage delay cycles are staged through the silos when buffering takes place, prioritization of delay signals correctly attributes delays to the stalls in later pipeline stages.

In one embodiment of the present invention, the prioritized signals from the prioritizer 620 are received by circuitry contained in the combiner 820 illustrated in FIG. 3. This circuitry includes five straight-through connections, and three logic gates which receive as inputs various of the prioritized signals outputted by the prioritizer 620. The combiner 820 outputs five staight-through signals, a "Branch Mispredict Cycle" signal, a "Data Access Cycle" signal, an "Execution Latency Cycle" signal, an "Instruction Access Cycle" signal, and a "Taken Branch Cycle" signal. The combiner 820 also outputs three combined signals, a "Combined Execution Cycle" signal, which is a combination of the "Execution Latency Cycles" signal and the "Issue Limit Cycle" signal, a "Combined Instruction Access Cycle" signal, and a "Combined Branch Cycle" signal. Other combinations may be made and outputted. In practice, counters are expense elements and therefore the quantity of available counters in a process are limited. For this reason, combinations of signals are useful. The present invention provides for the making and outputting of such useful combinations.

In one embodiment of the present invention, each of the prioritized output signals of the prioritizer 620 drives a counter which count the number of cycles in which a particular one of these signals is true. In another embodiment of the present invention, each of the output signals of the combiner 820 drives a counter which counts the number of cycles in which a particular one of these signals is true.

In each of the silos illustrated in FIGS. 2 and 3, the delay reason signals received from the pipeline, are staged down toward the end of the silo, synchronously with the pipeline. Synchronously, as used in this patent, means that the signals are staged down the silos, concurrently with pipeline operation, such that the bits travel down the silos in every clock cycle, and the bits traveling down the silos are not affected by delays in the pipeline.

In the illustrated embodiments, a static prioritization scheme is hard-wired into the performance monitor. The prioritization scheme need not be static; it may be dynamic. In an embodiment of the present invention programmable logic is used for the prioritizer, and the prioritization scheme contained in software and/or in microcode. In another embodiment, programmable logic is used for the combiner. In yet another embodiment, the prioritizer and combiner are combined. In still another embodiment, the performance monitor has a single silo and, consequently, there is no need for a prioritizer or a combiner.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A performance monitor comprising:
   at least two silos, each to receive at least one of a plurality of delay reason signals provided by a pipeline of a processor, said at least two silos including:
   a first silo to receive a first delay reason signal of said plurality of delay reason signals and to output a first staged signal;
   a second silo to receive a second delay signal of said plurality of delay reason signals and to output a second staged signal;
   a prioritizer, coupled to said first silo and coupled to said second silo, the prioritizer to receive said first and second staged signals and to output a plurality of prioritized signals; and
   a combiner, coupled to said prioritizer, the combiner to receive said plurality of prioritized signals and to output at least one signal.

2. The performance monitor of claim 1, wherein said combiner includes circuitry to output at least one straight-through signal.

3. The performance monitor of claim 2 wherein said at least one straight-through signal includes at least four signals, including a branch-mispredict cycle signal, an execution-latency cycle signal, a data-access cycle signal, and an instruction-access cycle signal.

4. The performance monitor of claim 1, wherein said combiner includes circuitry to output at least one combined signal.

5. The performance monitor of claim 1 wherein each said silo includes a plurality of latches.

6. The performance monitor of claim 1 wherein said first silo includes, in series, M stages.

7. The performance monitor of claim 6:
   wherein the main processor pipeline includes a plurality of pipeline stages, including an ith stage, and a jth stage, separated from each other by K stages, wherein said jth stage provides a jth delay reason signal of the plurality of delay reason signals; and
   wherein the number of stages M in said first silo is equal to K+1, and the jth delay reason signal is provided to the K+1st stage in said first silo.

8. The performance monitor of claim 6:
   wherein the processor pipeline includes a plurality of pipeline stages, including an ith stage and a jth stage, separated from each other by K stages, wherein said jth stage provides a jth delay reason signal of the plurality of delay reason signals; and
   wherein the number of stages M in said first silo is greater than K+1, and the jth delay reason signal is provided to the K+$1^{st}$ stage in said first silo.

9. The performance monitor of claim 8 wherein the jth delay reason signal is provided to the K+1st stage of said silo, to the Mth stage of said silo, and to each stage of the silo between the K+1st stage and the Mth stage.

10. The performance monitor of claim 6:
    wherein the processor pipeline includes a plurality of pipeline stages, including a jth stage, wherein said jth stage provides a jth delay reason signal of the plurality of delay reason signals; and
    wherein the number of stages in said first silo is one less than the number of stages in said pipeline, and the jth delay reason signal is provided to at least one stage in said first silo.

11. The performance monitor of claim 6 wherein:
    each of said stages in said first silo includes a single latch;
    said second silo includes, in series, P stages, and each such stage includes a single latch; and
    the number of stages P is not equal to the number of stages M.

12. The performance monitor of claim 6:
wherein the processor pipeline includes a plurality of pipeline stages, including an ith stage and a jth stage, separated from each other by K stages, wherein said jth stage provides a jth delay reason signal of the plurality of delay reason signals; and
wherein the number of stages M in said first silo is greater than K+1, and the jth delay reason signal is provided to one or more stages of one or more silos.

13. The performance monitor of claim 1 wherein said at least two silos includes eight silos, and said plurality of prioritized signals includes eight prioritized signals.

14. The performance monitor of claim 1 wherein each said silo includes one or more stages.

15. The performance monitor of claim 14 wherein each said stage includes a latch.

16. The performance monitor of claim 14 wherein each said stage includes a flip-flop.

17. The performance monitor of claim 14 wherein each said stage includes structure operable to store one or more bits.

18. The performance monitor of claim 1 wherein the prioritizer and the combiner are combined.

19. The performance monitor of claim 1 wherein the prioritizer includes programmable logic.

20. The performance monitor of claim 19 wherein the prioritizer has a prioritization scheme contained in software.

21. The performance monitor of claim 1 wherein the combiner includes programmable logic.

22. The performance monitor of claim 21 wherein the combiner has a combining scheme contained in software.

23. The performance monitor of claim 1:
wherein the pipeline includes a buffer stage and, relative to the buffer stage, a later down-stream stage,
wherein when the buffer stage becomes full due to the later down-stream stage, the later down-stream stage provides a delay reason signal.

24. The performance monitor of claim 23:
wherein the later down-stream stage is the xth stage of the pipeline,
wherein the first silo includes, in series, M stages, where M is equal to or greater than x, and
wherein the delay reason signal provided by the later down-stream stage is received by the xth stage of the first silo.

25. A system, comprising:
a processor, having a pipeline to provide a plurality of delay reason signals; and
a performance monitor, coupled to said pipeline, the performance monitor to operate in parallel to said pipeline and to receive at least two of said plurality of delay reason signals, said performance monitor including:
at least two silos, each said silo being coupled to said processor, and each said silo to receive at least one of the plurality of delay reason signals and to output a staged signal;
a prioritizer, coupled to each of said silos, the prioritizer to receive each of said staged signals and to output at least two prioritized signals; and
a combiner, coupled to said prioritizer, the combiner to receive each of the at least two prioritized signals and to output at least one signal.

26. The system of claim 25, wherein said combiner includes circuitry to output at least one straight-through signal.

27. The system of claim 25, wherein said combiner includes circuitry to output at least one combined signal.

28. The system of claim 25 wherein each said silo includes a plurality of latches.

29. The system of claim 25 wherein:
said pipeline includes L stages, and
one of said at least two silos includes, in series, M stages, and each such stage includes a single latch.

30. The system of claim 29 wherein L is greater than M.

31. The system of claim 29 wherein:
one of said at least two silos includes, in series, P stages, and each such stage includes a single latch; and
the number of stages P is not equal to the number of stages M.

32. The system of claim 13 wherein:
said prioritizer includes at least one logic gate; and
said at least two prioritized signals includes at least one signal that is a logical combination of at least two of said staged signals.

33. The system of claim 25 wherein:
said combiner includes at least one logic gate; and
said at least one signal outputted from said combiner includes at least one signal that is a logical combination of at least two of said at least two prioritized signals.

34. The system of claim 25
wherein the pipeline includes a buffer stage and, relative to the buffer stage, a later down-stream stage,
wherein when the buffer stage becomes full due to the later down stream stage, the later down-stream stage provides a delay reason signal.

35. The system of claim 34:
wherein the later down-stream stage is the xth stage of the pipeline,
wherein one of the at least two silos includes, in series, M stages, where M is equal to or greater than x, and
wherein the delay reason signal provided by the later down-stream stage is received by the xth stage of one of the at least two silos.

36. A method comprising:
receiving at least N of a plurality of delay reason signals;
staging each of the received at least N delay reason signals and outputting N staged signals;
prioritizing each of said N staged signals and outputting N prioritized signals; and
selectively combining said N prioritized signals and outputting at least one signal.

37. The method according to claim 36 wherein combining said N prioritized signals and outputting at least one signal includes outputting at least one straight-through signal.

38. The method according to claim 37 wherein outputting at least one straight-through signal includes:
outputting a branch-mispredict cycle signal;
outputting an execution-latency cycle signal;
outputting a data-access cycle signal; and
outputting an instruction-access cycle signal.

39. The method of claim 36 wherein combining said N prioritized signals and outputting at least one signal includes outputting at least one combined signal.

40. The method of claim 39 wherein outputting at least one combined signal includes:
outputting a combined branch cycle signal having branch mis-predict, taken branch, and dynamic/static branch bubble information;

outputting a combined execution cycle signal having execution-latency and issue-limit information; and outputting a combined instruction access cycle signal having instruction-access and fetch-window information.

41. The method of claim 36 wherein the delay reason signals are received from a microprocessor operating at a particular nominal frequency, further comprising carrying out the method at said particular nominal frequency of the microprocessor.

42. The method of claim 36 wherein the delay reason signals are received from a microprocessor that includes a pipeline, further comprising carrying out the method in parallel to said pipeline.

43. The method of claim 42, further comprising carrying out the method in synchronism with said pipeline.

44. The method of claim 36, wherein selectively combining said N prioritized signals and outputting at least one signal includes outputting at least one output signal, further comprising counting the number of bits contained in said at least one output signal.

45. The method of claim 36 wherein only one of said N prioritized signals is true in a particular clock cycle.

46. The method of claim 36 wherein one or more of said N prioritized signals is true in a particular clock cycle.

47. A performance monitor comprising:

at least one silo to receive one or more delay reason signals provided by a pipeline of a processor operating in parallel with the performance monitor and to output a staged signal.

48. The performance monitor of claim 47 wherein at least one silo has at least one stage, and the stage includes structure operable to store one or more bits.

49. The performance monitor of claim 47 further comprising:

a counter to receive the staged signal and to count the number of bits contained in said signal.

50. The performance monitor of claim 47 wherein said at least one silo includes two or more silos, further comprising:

circuitry to receive the staged signal from each of the silos and to output signals.

51. The performance monitor of claim 50 wherein the circuitry includes programmable logic to selectively prioritize and/or combine the staged signals.

52. A method comprising:

receiving one or more delay reason signals;

staging each of the received delay reason signals and outputting at least one staged signal; and counting the number of bits contained in the staged signal.

* * * * *

UNITED STATES PATENT AND TRADEMARK OFFICE
CERTIFICATE OF CORRECTION

PATENT NO. : 6,353,805 B1
DATED : March 5, 2002
INVENTOR(S) : Zahir et al.

It is certified that error appears in the above-identified patent and that said Letters Patent is hereby corrected as shown below:

Column 1,
Line 18, delete "Modem", insert -- Modern --.
Line 49, delete "modem", insert -- modern --.

Column 3,
Line 30, delete "Man", insert -- than --.

Signed and Sealed this

Twelfth Day of August, 2003

JAMES E. ROGAN
*Director of the United States Patent and Trademark Office*